United States Patent
Wakizaka et al.

(10) Patent No.: US 9,406,936 B2
(45) Date of Patent: Aug. 2, 2016

(54) CARBON MATERIAL, CARBON MATERIAL FOR BATTERY ELECTRODE, AND BATTERY

(71) Applicant: SHOWA DENKO K.K., Tokyo (JP)

(72) Inventors: Yasuaki Wakizaka, Tokyo (JP); Yuichi Kamijo, Tokyo (JP); Tomohiro Abe, Tokyo (JP); Yoshiki Shimodaira, Tokyo (JP); Akinori Sudoh, Tokyo (JP); Chiaki Sotowa, Tokyo (JP); Yoshihito Yokoyama, Tokyo (JP); Takashi Terashima, Tokyo (JP); Naoto Kawaguchi, Tokyo (JP)

(73) Assignee: SHOWA DENKO K.K., Tokyo (JP)

( * ) Notice: Subject to any disclaimer, the term of this patent is extended or adjusted under 35 U.S.C. 154(b) by 0 days.

(21) Appl. No.: 14/434,954

(22) PCT Filed: Oct. 11, 2013

(86) PCT No.: PCT/JP2013/077704
§ 371 (c)(1),
(2) Date: Apr. 10, 2015

(87) PCT Pub. No.: WO2014/058040
PCT Pub. Date: Apr. 17, 2014

(65) Prior Publication Data
US 2015/0263348 A1 Sep. 17, 2015

(30) Foreign Application Priority Data
Oct. 12, 2012 (JP) .................................. 2012-227044

(51) Int. Cl.
*H01M 4/13* (2010.01)
*H01M 4/587* (2010.01)
(Continued)

(52) U.S. Cl.
CPC ............... *H01M 4/587* (2013.01); *C01B 31/00* (2013.01); *H01M 10/0525* (2013.01);
(Continued)

(58) Field of Classification Search
CPC .............. C01B 31/00; H01M 10/0525; H01M 10/0569; H01M 2220/20; H01M 2220/30; H01M 2300/0028; H01M 4/587; Y02E 60/122; Y02T 10/7011
See application file for complete search history.

(56) References Cited

U.S. PATENT DOCUMENTS 5,587,255 A   12/1996   Sonobe et al.
6,632,569 B1  10/2003   Kameda et al.
(Continued)

FOREIGN PATENT DOCUMENTS

EP   0 918 040 A1   5/1999
JP   08-031422 A    2/1996
(Continued)

OTHER PUBLICATIONS

International Search Report for PCT/JP2013/077704 dated Jan. 7, 2014.

*Primary Examiner* — Patrick Ryan
*Assistant Examiner* — Ben Lewis
(74) *Attorney, Agent, or Firm* — Sughrue Mion, PLLC

(57) ABSTRACT

A carbon material containing boron atom in an amount of 0.001 to 0.5 mass %, in which the average interplanar spacing (d002) of plane (002) is 0.337 nm or less. By observing optical structures in cross-section of formed bodies made of the carbon material, when areas are accumulated from a smallest structure in an ascending order, SOP represents an area of an optical structure whose accumulated area corresponds to 60% of the total area of all optical structures; when the structures are counted from a structure of a smallest aspect ratio in an ascending order, AROP represents the aspect ratio of the structure which ranks at the position of 60% in total number of all the structures; and when D50 represents an average particle diameter; SOP, AROP and D50 satisfy the following relationship: $1.5 \leq AROP \leq 6$ and $0.2 \times D50 \leq (SOP \times AROP)^{1/2} < 2 \times D50$. Also disclosed is a secondary battery using the carbon material as an electrode material.

14 Claims, 1 Drawing Sheet

(51) Int. Cl.
  *H01M 10/0525*   (2010.01)
  *C01B 31/00*    (2006.01)
  *H01M 10/0569*   (2010.01)

(52) U.S. Cl.
  CPC ..... *H01M 10/0569* (2013.01); *H01M 2220/20* (2013.01); *H01M 2220/30* (2013.01); *H01M 2300/0028* (2013.01); *Y02E 60/122* (2013.01); *Y02T 10/7011* (2013.01)

(56) References Cited

U.S. PATENT DOCUMENTS

| | | |
|---|---|---|
| 7,141,229 B2 | 11/2006 | Kawano et al. |
| 8,372,373 B2 | 2/2013 | Nishimura et al. |

FOREIGN PATENT DOCUMENTS

| | | |
|---|---|---|
| JP | 10-312809 A | 11/1998 |
| JP | 11-040158 A | 2/1999 |
| JP | 2000-012020 A | 1/2000 |
| JP | 2000-012021 A | 1/2000 |
| JP | 3126030 B2 | 1/2001 |
| JP | 3361510 B2 | 1/2003 |
| JP | 2003-077534 A | 3/2003 |
| JP | 3534391 B2 | 6/2004 |
| JP | 3653105 B2 | 5/2005 |
| JP | 3725662 B2 | 12/2005 |
| JP | 2010-267875 A | 11/2010 |
| JP | 2011-066009 A | 3/2011 |
| JP | 2011-066010 A | 3/2011 |
| JP | 4945029 B2 | 6/2012 |
| WO | 2011/049199 A1 | 4/2011 |

CARBON MATERIAL, CARBON MATERIAL FOR BATTERY ELECTRODE, AND BATTERY

CROSS REFERENCE TO RELATED APPLICATIONS

This application is a National Stage of International Application No. PCT/JP2013/077704 filed Oct. 11, 2013, claiming priority based on Japanese Patent Application No. 2012-227044, filed Oct. 12, 2012, the contents of all of which are incorporated herein by reference in their entirety.

TECHNICAL FIELD

The present invention relates to a carbon material, a carbon material for a battery electrode, and a battery. Specifically, the present invention relates to a carbon material which exhibits high electrode filling property and high energy density as an electrode material for a non-aqueous electrolyte secondary battery; a method for producing the same; and a secondary battery having a high capacitance, good charge/discharge cycle characteristics, and high coulomb efficiency.

BACKGROUND ART

A lithium ion secondary battery has been developed for various uses and there has been a demand for performance suitable for various uses ranging from use in a small-sized mobile device to use in a large-sized battery-powered electric vehicle (BEV) and a hybrid electric vehicle (HEV).

For use in a mobile device, with the progress of small-size and lightweight electronic devices as well as increase in the power consumption due to the diversification of functions, a lithium ion secondary battery having a higher energy density is required.

In particular, in applications for automobiles, such as battery electric vehicles (BEV) and plug-in hybrid electric vehicles (PHEV), a long-term cycle characteristic over 10 years and a large current load characteristic for driving a high-power motor are mainly required, and a high volume energy density is also required for extending a driving range (distance). Since a large-sized lithium ion secondary battery is expensive, reduction in cost is also required.

Generally, a carbon material such as graphite, hard carbon and soft carbon is used as a negative electrode active substance for a lithium ion secondary battery. While hard carbon and soft carbon described in Japanese Patent No. 3653105 (U.S. Pat. No. 5,587,255; Patent Document 1) are excellent in a characteristic with respect to a large current and also have a relatively satisfactory cycle characteristic, the most widely used material is graphite.

Graphite is classified into natural graphite and artificial graphite.

Among those, natural graphite is available at a low cost and has high discharge capacity and electrode filling property due to high degree of graphitization. However, natural graphite has such problems that it has a high specific surface area since the particles have a scale shape, and that it has a significantly low coulomb efficiency at the initial charging and discharging because the electrolyte is decomposed due to highly reactive edge surfaces of graphite, which leading to gas generation. In addition, the cycle characteristics of a battery using natural graphite are not very good. In order to solve those problems, Japanese Patent publication No. 3534391 (U.S. Pat. No. 6,632,569, Patent Document 2) and the like propose a method involving coating carbon on the surface of the natural graphite processed into a spherical shape.

Regarding artificial graphite, there is exemplified a mesocarbon microsphere-graphitized article described in Japanese Patent No. 3126030 (Patent Document 3) and the like.

Graphitized articles made of oil, coal pitch, coke and the like is available at a relatively low cost. However, a satisfactory crystalline needle-shaped coke tends to align in a scale shape. In order to solve this problem, the method described in Japanese patent publication No. 3361510 (European Patent No. 0918040; Patent Document 4) and the like yield results.

JP-A-2003-77534 (Patent Document 5) teaches that excellent high-rate discharge can be achieved by using artificial graphite having highly-developed pores.

WO 2011/049199 (U.S. Pat. No. 8,372,373; Patent Document 6) discloses artificial graphite being excellent in cycle characteristics.

Japanese Patent No. 4945029 (U.S. Pat. No. 7,141,229; Patent Document 7) discloses an artificial graphite negative electrode produced from needle-shaped green coke having a flow configuration texture which is produced with the addition of boron.

Japanese Patent No. 3725662 (Patent Document 8) discloses a method of removing the boron nitride on the surface of the artificial graphite negative electrode manufactured by the addition of boron.

PRIOR ART

Patent Documents

Patent Document 1: JP 3653105 B2 (U.S. Pat. No. 5,587,255)
Patent Document 2: JP 3534391 B2
Patent Document 3: JP 3126030 B2
Patent Document 4: JP 3361510 B2 (European Patent No. 0918040)
Patent Document 5: JP 2003-77534 A
Patent Document 6: WO 2011/049199 (U.S. Pat. No. 8,372,373)
Patent Document 7: JP 4945029 B2 (U.S. Pat. No. 7,141,229)
Patent Document 8: JP 3725662 B2

DISCLOSURE OF THE INVENTION

Problems to be Solved by the Invention

The negative electrode material described in Patent Document 1 is excellent in properties against large current. However, its volume energy density is too low and the price of the material is very expensive, and thus, such negative electrode materials are only used for some special large batteries.

The material produced by the method described in Patent Document 2 can address a high-capacity, a low-current, and an intermediate-cycle characteristic required by the mobile applications, etc. However, it is very difficult for the material to satisfy the requests such as a large current and an ultralong-term cycle characteristic of a large battery as described above.

The graphitized article described in Patent Document 3 is a well-balanced negative electrode material, and is capable of producing a battery with a high capacity and a large current. However, it is difficult to achieve the cycle characteristic for a much longer period of time than the one for mobile applications, which are required for a large battery.

The method according to Patent Document 4 can allow the use of not only fine powder of an artificial graphite material but also fine powder of a natural graphite, or the like, and exhibits very excellent performance for a negative electrode material for the mobile applications. This material can address the high-capacity, the low-current, and the intermediate cycle characteristic required for the mobile applications, etc. However, this material has not satisfied requests such as a large current and an ultralong-term cycle characteristic of a large battery as described above.

In Patent Document 5, the capacity retention at the time of charge and discharge is not sufficient for actual use in secondary batteries.

In Patent Document 6, the graphite has a high texture density and there was room for improvement on the ion diffusion of the active substance.

In Patent Document 7, although the capacity and initial charge-discharge efficiency showed some improvement compared to the case of using conventional artificial graphite, it is very expensive in the production cost for carbonization by pulverizing green coke followed by calcination, and for graphitization conducted in argon atmosphere, and therefore has not been developed to a practical level.

In Patent Document 8, effect of reducing contact resistance is obtained by pulverizing and grinding a negative electrode material to which boron is added to thereby remove boron nitride generated on the surface of the negative electrode material. However, it is high in cost due to an increase in the processes for pulverization and grinding and therefore has not been practical. It also had a problem that the specific surface area increases due to the pulverization after graphitization.

Means to Solve the Problem

[1] A carbon material, which contains boron atom in an amount of 0.001 to 0.5 mass %, in which the average interplanar spacing d002 of plane (002) by the X-ray diffraction method is 0.337 nm or less; and by observing the optical structures in the cross-section of the formed body made of the carbon material in a rectangular field of 480 μm×540 μm under a polarizing microscope, when areas of the optical structures are accumulated from a smallest structure in an ascending order, SOP represents an area of an optical structure whose accumulated area corresponds to 60% of the total area of all the optical structures; when the structures are counted from a structure of a smallest aspect ratio in an ascending order, AROP represents the aspect ratio of the structure which ranks at the position of 60% in the total number of all the structures; and when D50 represents a volume-based average particle diameter by laser diffraction method; SOP, AROP and D50 satisfy the following relationship:

$$1.5 \leq AROP \leq 6 \text{ and}$$

$$0.2 \times D50 \leq (SOP \times AROP)^{1/2} < 2 \times D50.$$

[2] The carbon material as described in [1] above, wherein the carbon material has a volume-based average particle diameter by laser diffraction method (D50) of 1 μm or more and 50 μm or less.

[3] The carbon material as described in [1] or [2] above, which is artificial graphite treated at a temperature of 3,000° C. or more and 3,600° C. or less in atmosphere containing 50 vol % or more of nitrogen.

[4] The carbon material as described in any one of [1] to [3] above, of which the BET specific surface area is 0.4 m²/g or more and 5 m²/g or less.

[5] A method for producing the carbon material as described in any one of [1] to [4] above, comprising a process of mixing boron or a boron compound into the particles obtained by pulverizing the calcined coke in an amount of 0.01 to 2 mass % in terms of boron atom and subjecting the mixture to heat treatment at a temperature of 3,000° C. or more and 3,600° C. or less in atmosphere containing 50 vol % or more of nitrogen.

[6] The production method as described in [5] above, wherein by observing the optical structures of the calcined coke in a rectangular field of 480 μm×540 μm under a polarizing microscope, when areas of the optical structures are accumulated from a smallest structure in an ascending order, the area of an optical structure whose accumulated area corresponds to 60% of the total area of all the optical structures is 10 μm² or more and 5,000 μm² or less; when the optical structures are counted from a structure of a smallest aspect ratio in an ascending order, the aspect ratio of the structure which ranks at the position of 60% in the total number of all the structures is 1.5 or more and 6 or less.

[7] A carbon material for a battery electrode, comprising the carbon material as described in any one of [1] to [4].

[8] A carbon material for a battery electrode, comprising 100 parts by mass of the carbon material as described in any one of [1] to [4] and 0.01 to 200 parts by mass of natural graphite or artificial graphite, wherein an average interplanar spacing (d002) of the natural graphite or artificial graphite is 0.3370 nm or less.

[9] A carbon material for a battery electrode, comprising 100 parts by mass of the carbon material as described in any one of [1] to [4] and 0.01 to 120 parts by mass of natural graphite or artificial graphite, wherein an aspect ratio of the natural graphite or artificial graphite is 2 to 100, and an average interplanar spacing (d002) of the natural graphite or artificial graphite is 0.3370 nm or less.

[10] A paste for an electrode comprising the carbon material for a battery electrode as described in any one of [7] to [9] above and a binder.

[11] An electrode comprising a formed body of the paste for an electrode as described in [10] above.

[12] A battery comprising the electrode described in [11] above as a constituting element.

[13] A lithium ion secondary battery comprising the electrode described in [11] above as a constituting element.

[14] The lithium ion secondary battery as described in [13] above, containing a non-aqueous electrolyte and/or non-aqueous polymer electrolyte, wherein a non-aqueous solvent used for the non-aqueous electrolyte and/or non-aqueous polymer electrolyte is at least one member selected from a group consisting of ethylene carbonate, diethyl carbonate, dimethyl carbonate, methylethyl carbonate, propylene carbonate, butylene carbonate, γ-butyrolactone and vinylene carbonate.

Effects of the Invention

Using the carbon material of the present invention as the carbon material for the battery electrode makes it possible to obtain a low-resistance battery electrode which has a high capacity, high energy density and high coulomb efficiency, and the capability of high-speed charge and discharge when a battery is fabricated, while maintaining high cycle characteristics.

Further, the carbon material of the present invention can be produced by the method excellent in economic efficiency and mass productivity with safety improved.

Figure 1:
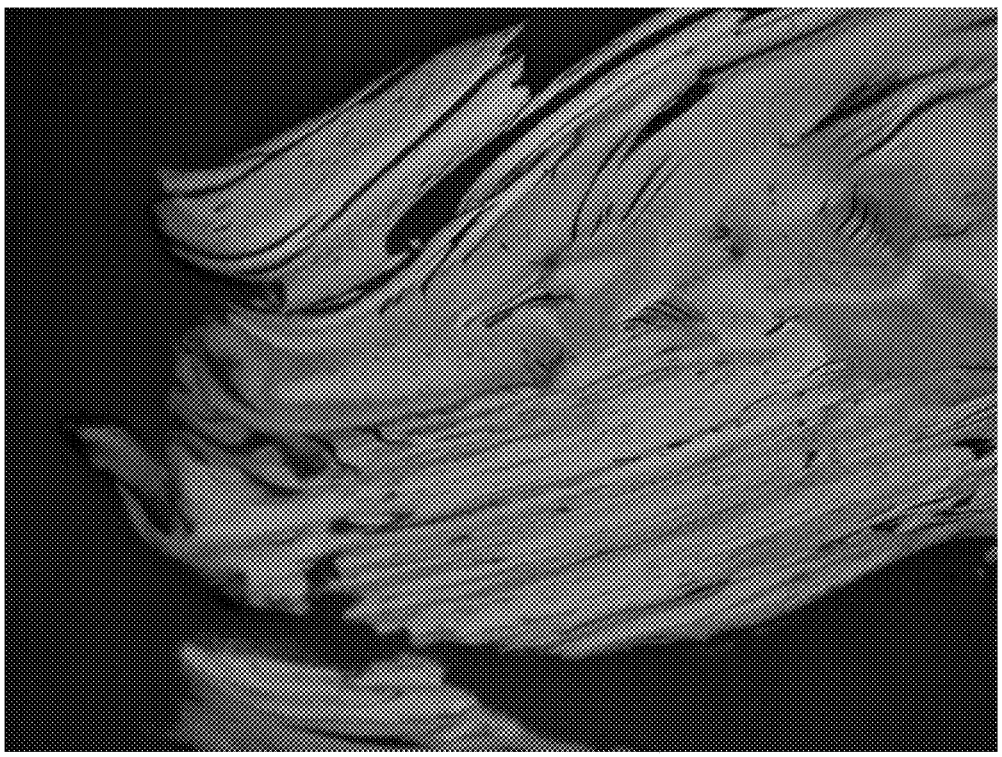
FIG. 1 shows a polarizing microscope image (480 μm×540 μm) of the calcined coke of Example 2. The black portion is resin and the gray portion is optical structures.

MODE FOR CARRYING OUT THE INVENTION (1) Carbon Material

The electrode of the rechargeable battery is required to charge more electricity per unit volume. Graphite is excellent in coulomb efficiency at initial charge and discharge. However, there is an upper limit to the stoichiometric proportion of the lithium atoms to carbon atoms at the time of intercalation and it is difficult to increase the energy density per mass. Therefore, it is necessary to increase the mass density per electrode volume to improve the energy density of the electrode.

Generally, to be used as an electrode for a battery, an electrode is produced by drying an active substance applied onto a current collector plate and subsequent pressing to thereby improve the filling property of the negative electrode active substance per volume. If the graphite particles are soft enough to be deformed to some degree by pressing, it is possible to significantly increase the electrode density.

Since graphite particles are hard when the graphite has a complicated structure or low orientation, it is necessary to allow the graphite particles to have a large structure in order to increase the electrode density. It has been long known that there is a structure in which crystal grows and graphite planes are arranged exhibits optical anisotropy, and a structure in which crystal does not develop completely or a material such as hard carbon in which crystal is largely disturbed exhibits optical isotropy. With respect to the observation of these structures, a crystal size can be measured by the X-ray diffraction method and the structures can be observed by a polarizing microscope observation method described in, for example, "Modern Carbon Material Experimental Technology (Analysis part) edited by The Carbon Society of Japan (2001), published by Sipec Corporation, pages 1-8". In the present invention, a structure in which birefringence can be observed is referred to as an optical structure.

In the carbon material in a preferable embodiment of the present invention, the size and shape of the optical structures are within a specific range. Furthermore, due to an appropriate degree of graphitization, it becomes a material being excellent both in easiness to be collapsed as a material for an electrode and in battery properties.

With respect to the size and shape of the optical structure, it is desirable that the above-mentioned carbon material satisfies the following formula:

$$1.5 \leq AROP6 \text{ and}$$

$$0.2 \times D50 \leq (SOP \times AROP)^{1/2} < 2 \times D50$$

By observing optical structures in the cross-section of the formed body made of the carbon material in a rectangular field of 480 μm×540 μm under a polarizing microscope, when areas of the optical structures are accumulated from the smallest structure in an ascending order, SOP represents the area of the optical structure whose accumulated area corresponds to 60% of the total area of all the optical structures. When the structures are counted from a structure of the smallest aspect ratio in an ascending order, AROP represents the aspect ratio of the structure which ranks at the position of 60% in the total number of all the structures.

D50 represents a particle diameter corresponding to the accumulated diameter of 50% of the cumulative total of diameters (an average particle diameter) based on a volume measured by a laser-diffractometry particle size distribution analyzer, and represents an apparent diameter of the scale-like particles. As a laser diffraction type particle size distribution analyzer, for example, Mastersizer (registered trademark) produced by Malvern Instruments Ltd. or the like can be used.

The carbon material in a preferable embodiment of the present invention has a scale-like shape. Since the optical structures in the carbon material are cured while flowing, it is often strip-shaped. When the cross-section of a formed body composed of the carbon material is observed, the shape of the optical structures is almost rectangular, and it can be assumed that the area of the structure corresponds to the product of the long side and the short side of the structure. Also, the short side is the long side/aspect ratio. Assuming that the optical structure as an object to be measured for the area represented by SOP and the optical structure as an object to be measured for the aspect ratio represented by AROP are the same, the long side in the optical structure turns to be $(SOP \times AROP)^{1/2}$. That is, $(SOP \times AROP)^{1/2}$ defines the long side in an optical structure having a specific size, and based on the ratio of $(SOP \times AROP)^{1/2}$ to the average particle diameter (D50), the above-mentioned formula defines that the optical structure is larger than a certain size.

$(SOP \times AROP)^{1/2}$ which defines a long side of an optical structure is generally smaller than an average particle diameter D50. However, when the $(SOP \times AROP)^{1/2}$ value is closer to D50, it means that the particles in the carbon material consist of a smaller number of optical structures. In a case where $(SOP \times AROP)^{1/2}$ is smaller compared to D50, it means that the particles in the carbon material comprise a large number of optical structures. When the $(SOP \times AROP)^{1/2}$ value is 0.2×D50 or more, there are fewer borders of the optical structures, which is preferable for the lithium ion diffusion and enables a high-rate charge and discharge. When the value is larger, the carbon material can retain a larger number of lithium ions. The value is preferably 0.25×D50 or more, more preferably 0.28×D50 or more, and still more preferably 0.35×D50 or more. The value is less than 2×D50 at maximum, and preferably 1×D50 or less.

The average particle diameter (D50) of the carbon material in a preferable embodiment of the present invention is 1 μm or more and 50 μm or less. Pulverizing by special equipment is required to make D50 less than 1 μm and more energy is required as a result. On the other hand, if the D50 value is too large, it takes a longer time for the lithium diffusion in the negative electrode material and it tends to reduce the charge and discharge rate.

A preferred D50 value is from 5 μm to 35 μm. Considering that fine powder has a large surface area and is likely to give rise to an unintended reaction so that it should be reduced, D50 is more preferably 10 μm or more. When the carbon material is for use in the drive power source for automobile and the like required generating a large current, D50 is preferably 25 μm or less.

The aspect ratio of the carbon material, AROP, is preferably 2.0 or more and 4.0 or less. An aspect ratio larger than the above lower limit is preferable because it allows the structures to slide over each other and an electrode having a high density can be easily obtained. An aspect ratio smaller than the upper limit is preferable because it requires less energy to synthesize a raw material.

The methods for observation and analysis of the optical structures are as described below.

[Production of Polarizing Microscope Observation Sample]

The "cross-section of the formed body made of a carbon material" as used herein is prepared as follows.

A double-stick tape is attached to the bottom of a sample container made of plastic with an internal volume of 30 cm$^3$, and two spatula scoops (about 2 g) of a sample for observation is placed on the double-stick tape. A curing agent (Curing Agent (M-agent) (trade name), produced by Nippon Oil and Fats Co., Ltd., available from Marumoto Struers K.K.) is added to cold mounting resin (Cold mounting resin #105 (trade name), produced by Japan Composite Co., Ltd., available from Marumoto Struers K.K.), and the mixture is kneaded for 30 seconds. The resultant mixture (about 5 ml) is poured slowly to the sample container to a height of about 1 cm and allowed to stand still for 1 day to be coagulated. Next, the coagulated sample is taken out and the double-stick tape is peeled off. Then, a surface to be measured is polished with a polishing machine with a rotary polishing plate.

The polishing is performed so that the polishing surface is pressed against the rotary surface. The polishing plate is rotated at 1,000 rpm. The polishing is performed successively, using #500, #1000, and #2000 of the polishing plates in this order, and finally, mirror-surface polishing is performed, using alumina (BAIKALOX (registered trademark) type 0.3 CR (trade name) with a particle diameter of 0.3 μm, produced by BAIKOWSKI, available from Baikowski Japan).

The polished sample is fixed onto a preparation with clay and observed with a polarizing microscope (BX51, produced by Olympas Corporation).

[Polarizing Microscope Image Analysis Method]

The observation was performed at 200-fold magnification. An image observed with the polarizing microscope is photographed by connecting a CAMEDIA C-5050 ZOOM digital camera produced by Olympas Corporation to the polarizing microscope through an attachment. The shutter time is 1.6 seconds. Among the photographing data, images with 1,200× 1,600 pixels were included in the analysis. It corresponds to investigation in a microscope field of 480 μm×540 μm. The image analysis was performed using ImageJ (produced by National Institutes of Health) to judge blue portions, yellow portions, magenta portions and black portions.

The parameters defining each color when ImageJ was used are given below.

TABLE 1

|  | Hue value | Saturation value | Brightness value |
|---|---|---|---|
| Blue | 150 to 190 | 0 to 255 | 80 to 255 |
| Yellow | 235 to 255 | 0 to 255 | 80 to 255 |
| Magenta | 193 to 255 | 180 to 255 | 120 to 255 |
| Black | 0 to 255 | 0 to 255 | 0 to 120 |

The statistical processing with respect to the detected structures is performed using an external macro-file. The black portions, that is, portions corresponding not to optical structures but to resin are excluded from the analysis, and the area and aspect ratio of each of blue, yellow and magenta optical structures are to be calculated.

The carbon material in a preferable embodiment of the present invention contains boron atoms in an amount of 0.001 mass % or more and 0.5 mass % or less. The boron atom content is preferably 0.1 mass % or more and 0.5 mass % or less. The boron atom content in a carbon material can be measured by the ICP emission spectrometry method.

A carbon material which has relatively large optical structures and a small crystal interplanar spacing (d002) to be described later, in which graphite planes are aligned to each other, is likely to develop edge portions, and becomes highly reactive in the portions. Using such a carbon material as an electrode material leads to the decomposition reaction of the electrolyte, and tends to lower the coulomb efficiency at the initial charging and discharging. In a preferred embodiment of the present invention, boron is contained in a carbon material so as to increase sp$^3$ bonds in the end face (edge portion) of the particles, which can increase defects uniformly and decrease the reactivity in the edge portions. As a result, it is possible to achieve a coulomb efficiency at the initial charging and discharging as high as 90% or more.

By making the boron atom content within the above-mentioned range, it is possible to suppress the rise in the electrode potential and to derive higher energy. When a boron atom content is particularly high, it is likely to cause a problem.

The carbon material in a preferable embodiment of the present invention has an average interplanar distance (d002) of plane (002) by the X-ray diffraction method of 0.337 nm or less. This increases the amount of lithium ions to be intercalated and desorbed per mass of the carbon material; i.e. increases the weight energy density. Further, a thickness of the crystal in the C-axis direction (Lc) is preferably 50 to 1,000 nm from the viewpoint of the weight energy density and easiness to be collapsed. When d002 is 0.337 nm or less, most of the optical structures observed by a polarizing microscope are found to be optically anisotropic.

d002 and Lc can be measured using a powder X-ray diffraction (XRD) method by a known method (see I. Noda and M. Inagaki, Japan Society for the Promotion of Science, 117th Committee material, 117-71-A-1 (1963), M. Inagaki et al., Japan Society for the Promotion of Science, 117th committee material, 117-121-C-5 (1972), M. Inagaki, "carbon", 1963, No. 36, pages 25-34).

In a preferred embodiment of the present invention, the BET specific surface area of the carbon material is 0.4 m$^2$/g to 5 m$^2$/g, more preferably 0.5 m$^2$/g to 3.5 m$^2$/g and still more preferably 0.5 m$^2$/g to 3.0 m$^2$/g. By setting the BET specific surface area to be within the above-mentioned range, a wide area to be contacted with an electrolyte can be secured without excessive use of a binder and lithium ions can be smoothly intercalated and desorbed, and thereby the reaction resistance of the battery can be lowered.

The BET specific surface area is measured by a common method of measuring the absorption and desorption amount of gas per mass. As a measuring device, for example, NOVA-1200 can be used.

It is preferred that the loose bulk density (0 tapping) of the carbon material of the present invention be 0.7 g/cm$^3$ or more, and the powder density (tap density) when tapping is performed 400 times be 0.8 g/cm$^3$ to 1.6 g/cm$^3$. The powder density is more preferably 0.9 g/cm$^3$ to 1.6 g/cm$^3$, most preferably 1.1 g/cm$^3$ to 1.6 g/cm$^3$.

The loose bulk density is obtained by dropping 100 g of the sample to a graduated cylinder from a height of 20 cm, and measuring the volume and mass without applying a vibration. The tap density is obtained by measuring the volume and mass of 100 g of powder tapped 400 times using an Autotap produced by Quantachrome Instruments.

These methods are based on ASTM B527 and JIS K5101-12-2, and the fall height of the Autotap in the tap density measurement is 5 mm.

By setting the loose bulk density to be 0.7 g/cm$^3$ or more, the electrode density before pressing at a time of application to an electrode can be enhanced further. Based on this value, it can be predicted whether or not a sufficient electrode density can be obtained by one roll pressing. Further, if the tap density is within the above-mentioned range, the electrode density achieved during pressing can be enhanced sufficiently.

The carbon material in a preferred embodiment of the present invention may be the one in which a part of carbon fiber adheres to the surface thereof. By allowing a part of the carbon fiber to adhere to the surface of the carbon material, the carbon fiber in an electrode is easily dispersed, and the cycle characteristic and the current load characteristic are further enhanced due to the synergetic effect of the carbon fiber in combination with the characteristics of the carbon material serving as the core material.

Although the adhesion amount of the carbon fiber is not particularly limited, the adhesion amount is preferably 0.1 to 5 parts by mass in terms of 100 parts by mass of the carbon material serving as a core.

Examples of the carbon fiber include: organic carbon fiber such as PAN-based carbon fiber, pitch-based carbon fiber, and rayon-based carbon fiber; and vapor-grown carbon fiber. Of those, particularly preferred is vapor-grown carbon fiber having high crystallinity and high heat conductivity. In the case of allowing the carbon fiber to adhere to the surfaces of the carbon material, particularly preferred is vapor-grown carbon fiber.

Vapor-grown carbon fiber is, for example, produced by: using an organic compound as a material; introducing an organic transition metal compound as a catalyst into a high-temperature reaction furnace with a carrier gas to form fiber; and then conducting heat treatment (see, for example, JP 60-54998 A and JP 2778434 B2). The vapor-grown carbon fiber has a fiber diameter of 2 to 1,000 nm, preferably 10 to 500 nm, and has an aspect ratio of preferably 10 to 15,000.

Examples of the organic compound serving as a material for carbon fiber include toluene, benzene, naphthalene, ethylene, acetylene, ethane, natural gas, a gas of carbon monoxide or the like, and a mixture thereof. Of those, an aromatic hydrocarbon such as toluene or benzene is preferred.

The organic transition metal compound includes a transition metal serving as a catalyst. Examples of the transition metal include metals of Groups IVa, Va, VIa, VIIa, and VIII of the periodic table. Preferred examples of the organic transition metal compound include compounds such as ferrocene and nickelocene.

The carbon fiber may be obtained by pulverizing or shredding long fiber obtained by vapor deposition or the like. Further, the carbon fiber may be agglomerated in a flock-like manner.

Carbon fiber which has no pyrolyzate derived from an organic compound or the like adhering to the surface thereof or carbon fiber which has a carbon structure with high crystallinity is preferred.

The carbon fiber with no pyrolyzate adhering thereto or the carbon fiber having a carbon structure with high crystallinity can be obtained, for example, by sintering (heat-treating) carbon fiber, preferably, vapor-grown carbon fiber in an inactive gas atmosphere. Specifically, the carbon fiber with no pyrolyzate adhering thereto is obtained by heat treatment in inactive gas such as argon at about 800° C. to 1,500° C. Further, the carbon fiber having a carbon structure with high crystallinity is obtained by heat treatment in inactive gas such as argon preferably at 2,000° C. or more, more preferably 2,000° C. to 3,000° C.

It is preferred that the carbon fiber contains branched fiber. Further, the fiber as a whole may have a portion having hollow structures communicated with each other. For this reason, carbon layers forming a cylindrical portion of the fiber are formed continuously. The hollow structure refers to a structure in which a carbon layer is rolled up in a cylindrical shape and includes an incomplete cylindrical structure, a structure having a partially cut part, two stacked carbon layers connected into one layer, and the like. Further, the cross-section is not limited to a complete circular cross-section, and the cross-section of the cylinder includes an oval cross-section or a polygonal cross-section.

Further, the average interplanar spacing d002 of a (002) plane by the X-ray diffraction method of the carbon fiber is preferably 0.344 nm or less, more preferably 0.339 nm or less, particularly preferably 0.338 nm or less. Further, it is preferred that a thickness ($L_c$) in a C-axis direction of crystal is 40 nm or less.

(2) Method for Producing a Carbon Material

The carbon material in a preferable embodiment of the present invention can be produced by mixing boron or a boron compound with the particles obtained by pulverizing calcined coke, and subjecting the mixture to heat treatment.

As a raw material of calcined coke, for example, petroleum pitch, coal pitch, coal pitch coke, petroleum coke and the mixture thereof can be used. Among these, preferred is the coke obtained by a delayed coking process under specific conditions and the subsequent heating under an inert atmosphere.

Examples of raw materials to pass through a delayed coker include decant oil which is obtained by removing a catalyst after the process of fluid catalytic cracking to heavy distillate at the time of crude refining, and tar obtained by distilling coal tar extracted from bituminous coal and the like at a temperature of 200° C. or more and heating it to 100° C. or more to impart sufficient flowability. It is desirable that these liquids are heated to 450° C. or more, or even 510° C. or more, during the delayed coking process, at least at an inlet of the coking drum in order to increase the residual carbon ratio of the coke at the time of calcination. Also, pressure inside the drum is kept at preferably an ordinary pressure or higher, more preferably 300 kPa or higher, still more preferably 400 kPa or higher to increase the capacity of a negative electrode. As described above, by performing coking under more severe conditions than usual, the reaction of the liquids is further enhanced and coke having a higher degree of polymerization can be obtained.

The obtained coke is to be cut out from the drum by water jetting, and roughly pulverized to lumps about the size of 5 centimeters with a hammer and the like. A double roll crusher and a jaw crusher can be used for the rough pulverization, and it is desirable to pulverize the coke so that the particles larger than 1 mm in size account for 90 mass % or more of the powder. If the coke is pulverized too much to generate a large amount of fine powder having a diameter of 1 mm or less, problems such as the dust stirred up after drying and the increase in burnouts may arise in the subsequent processes such as heating.

Next, the roughly pulverized coke is subjected to calcination. The calcination means to perform heating to remove moisture and volatile organic compounds.

The coke before calcination is relatively flammable. Therefore, the coke is to be soaked with water to prevent fires. The coke soaked with water contaminates equipment and surrounding space with muddy fine powder containing water, and is inferior in handleability. Calcination can provide significant advantage in terms of handleability. Also, when the calcined coke is subjected to graphitization, it promotes the development of crystals.

The calcination is performed by electric heating and flame heating of LPG, LNG, heating oil and heavy oil. Since a heat source of 2,000° C. or less is sufficient to remove moisture and organic volatile compounds, flame heating as an inexpensive heat source is preferable for mass production. When the treatment is performed on a particularly-large scale, energy cost can be reduced by an inner-flame or inner-heating type heating of coke while burning fuel and the organic volatile compounds contained in the unheated coke in a rotary kiln.

It is desirable that the area and aspect ratio of a specific optical structure of the calcined coke are within a specific range. The area and aspect ratio of an optical structure can be calculated by the above-mentioned method. Also, when the calcined coke is obtained as a lump of a few centimeters in size, the lump as produced is embedded in resin and subjected to mirror-like finishing and the like, and the cross-section is observed by a polarizing microscope to calculate the area and aspect ratio of an optical structure.

In the case where the optical structures are observed in a rectangular field of 480 μm×540 μm in the cross-section of the calcined coke under a polarizing microscope, when areas of the optical structures are accumulated from the smallest structure in an ascending order, an area of an optical structure whose accumulated area corresponds to 60% of the total area of all the optical structures is preferably 10 μm$^2$ to 5,000 μm$^2$, more preferably 10 μm$^2$ to 1,000 μm$^2$, and still more preferably 20 μm$^2$ to 500 μm$^2$. When the calcined coke having the area of an optical structure within the above-mentioned range is graphitized, the graphite is going to have a fully developed crystal structure and can retain lithium ions at a higher density. Also, as the crystals develop in a more aligned state and the fracture surfaces of the crystals slide over each other, the resultant graphite has a higher degree of freedom for the particle shape when an electrode is pressed, which improves filling property and is preferable.

In the case where the optical structure of the calcined coke is observed in the same way as described above, when the optical structures are counted from a structure of the smallest aspect ratio in an ascending order, the aspect ratio of the structure which ranks at the position of 60% in the total number of all the structures is preferably 1.5 to 6.

Next, the calcined coke is to be pulverized.

There is not particular limit to the method of pulverization, and pulverization can be performed using a known jet mill, hammer mill, roller mill, pin mill, vibration mill or the like.

It is desirable to perform pulverization so that coke has a volume-based average particle diameter (D50) of from 1 μm to 50 μm. To perform pulverization to make D50 less than 1 μm, it requires use of specific equipment and a large amount of energy. When D50 is too large, the lithium ion diffusion takes time when the coke is made into an electrode and it is likely to reduce the charge and discharge rate. D50 is more preferably from 5 μm to 35 μm. Considering that fine powder has a large surface area and is likely to give rise to an unintended reaction so that it is better reduced, D50 is more preferably 10 μm or more. When the carbon material is for use in the drive power source for automobile and the like required generating a large current, D50 is preferably 25 μm or less.

After mixing boron or a boron compound with the pulverized particles of calcined coke, the mixture is subjected to heat treating. Graphitization is caused by the heat treatment.

In a graphitized carbon material obtained by subjecting calcined coke having a specific size of optical structures and good characteristics of easiness to be collapsed to heat treatment, edge portions of the particles constituting a material are developed. Therefore, it is highly responsive to the electrolyte and consumes much electricity in the initial charging: i.e. at the time of the lithium ion intercalation, which results in forming an excessively thick coating. As a result, it inhibits reversible intercalation and release reaction of lithium ions and may adversely affect on the battery life such as cycle characteristics. By adding a specific amount of boron or a boron compound to the pulverized particles of calcined coke and subjecting the mixture to heat treatment, sp$^3$ bonds (defects) in the end face (edge portions) of particles increases, which will decrease reactivity to the electrolyte and improves the coulomb efficiency at the initial charging and discharging.

As a boron compound, boric acid, boron oxide, boron carbide and the like can be used. The amount of addition is preferably 0.01 mass % or more and 2.0 mass % or less in terms of boron atom to the pulverized particles of calcined coke, more preferably 0.1 mass % or more and 1.0 mass % or less. When the amount of boron to be added is too small, full effect of boron addition may not be achieved in some cases. When the amount of boron to be added is too large, it leads to rise in electrode potential and is liable to decrease the energy to be derived.

The heat treatment is preferably conducted at a temperature of 3,000° C. or more and in atmosphere containing 50 vol % or more of nitrogen. It is favorable for the reason that the production cost can be reduced by conducting the heat treatment in atmosphere close to the general atmospheric composition. Preferred is heat treatment in air.

The nitrogen concentration to be measured here does not mean the concentration in powder but the concentration in atmosphere inside the container of the powder and about 20 cm apart from the powder. Since various gases are emitted from the powder during the heat treatment, it is preferable to measure the concentration in a region which will be unaffected.

The higher heat treatment temperature is not necessarily better. If the temperature is higher than 3,600° C., it is difficult to prevent the sublimation of the carbon material and an unduly large amount of energy is required. Therefore, the graphitization temperature is preferably 3,600° C. or lower. It is desirable to use electric energy to attain the above temperature. Electric energy is more expensive than other heat source and in particular to attain a temperature of 2,000° C. or higher, an extremely large amount of electricity is consumed. Therefore, it is preferable not to consume the electric energy except for graphitization, and to calcine the carbon material prior to the graphitization to remove the organic volatile content: i.e. to make the fixed carbon content be 95% or more, preferably 98% or more, and still more preferably 99% or more. Conducting calcination before graphitization, and even before pulverization, is assumed to be effective in developing the precursors of graphite crystals in a status of large particles: i.e. in a wider range, which is favorable. A carbon material obtained by conducting calcination before pulverization is assumed to have larger textures of graphite crystal precursors and preferable to a carbon material obtained by conducting calcination after pulverization.

In the conventional technology of adding boron, heat treatment in argon atmosphere at about 2,600 to 3,000° C. was often used as a method for suppressing the generation of boron nitride as taught by Japanese patent No. 4945029 (Patent Document 7), for example. However, the heat treatment in argon atmosphere requires an enormous amount of energy since the heat is released out of the system. Also, the cost is hugely expensive due to the use of argon and therefore it has not been a practical production method. In addition, partly for the reason that a boron compound serves as a catalyst for graphitization, boron was added in many cases of conventional technology. For example, in Japanese patent No. 4014637 (European patent No. 0935302), 3 mass % or more of boron exists in a carbon material after heat treatment. However, when boron exists in such a large amount, it leads to rise in negative electrode potential and decrease in energy derived from a battery as a whole.

In contrast, by mixing a small amount of boron or a boron compound in the pulverized particles of calcined coke having optical structures as taught by the present invention and by subjecting the mixture to heat treatment at a temperature of 3,000° C. or more and 3,600° C. or less, it is possible not only to suppress the generation of boron nitride but to decrease the electrical resistance of the electrode. The electrical resistance increases in both cases of adding boron in an excessive amount and adding no boron. Such effects cannot be achieved in the case of using calcined coke having other optical structures. In addition, the above method can limit the residual boron to thereby suppress the rise in potential due to the presence of boron.

There is no limitation on the graphitization treatment as long as it is performed in air. The treatment can be carried out, for example, by a method of putting a carbon material in a graphite crucible in an Acheson furnace filled with a filler of carbon particles or graphite particles; and generating heat by passing a current to thereby carry out graphitization.

However, when the graphitization is carried out as described above, an impurity component derived from the carbon material is likely to precipitate in the region being in contact with air, and it is desirable to remove it. Examples of the method for removing the impurity include a method of removing the graphite material in the region from the position being in contact with air to a predetermined depth. That is, the graphite material underlying deeper than the above position is obtained. A determined depth is 2 cm, preferably 3 cm and more preferably 5 cm from the surface.

In a preferable embodiment of the present invention, as the reactivity in the edge portions is decreased by graphitization, the material is not subjected to pulverizing treatment after graphitization. Note that the material may be disintegrated within limits that do not pulverize the particles after the graphitization.

In the case where a part of carbon fiber is allowed to adhere to the surface of the carbon material, the adhesion method is not particularly limited. Examples of the methods include a method of mixing the obtained carbon material and carbon fiber by a mechanochemical method with a Mechanofusion (registered trademark) produced by Hosokawa Micron Corporation, and a method of mixing carbon fiber into the pulverized calcined coke and boron or a boron compound to be well dispersed and next subjected to graphitization treatment.

(3) Carbon Material for Battery Electrodes

The carbon material for battery electrodes in a preferred embodiment of the present invention contains the above-mentioned carbon material. When the above-mentioned carbon material is used as a battery electrode, battery electrode having a high energy density can be obtained, while maintaining a high capacity, a high coulomb efficiency and high cycle characteristics.

The carbon material for a battery electrode may be used as, for example, a negative electrode active material and an agent for imparting conductivity to a negative electrode of a lithium ion secondary battery.

The carbon material for battery electrodes in a preferred embodiment of the present invention may comprise the above-mentioned carbon material only. It is also possible to use the materials obtained by blending spherical natural or artificial graphite having d002 of 0.3370 nm or less in an amount of 0.01 to 200 parts by mass and preferably 0.01 to 100 parts by mass; or by blending natural or artificial graphite (for example, graphite having a scale shape) having d002 of 0.3370 nm or less and aspect ratio of 2 to 100 in an amount of 0.01 to 120 parts by mass and preferably 0.01 to 100 parts by mass based on 100 parts by mass of the carbon material. By using the graphite material mixed with other graphite materials, the carbon material can be added with excellent properties of other graphite materials while maintaining the excellent characteristics of the carbon material in a preferred embodiment of the present invention. With respect to mixing of these materials, the blending amount can be determined by appropriately selecting the materials to be mixed depending on the required battery characteristics.

Carbon fiber may also be mixed with the carbon material for battery electrodes. As the carbon fiber, carbon fiber similar to the carbon fiber described above may be used. The mixing amount is 0.01 to 20 parts by mass, preferably 0.5 to 5 parts by mass in terms of total 100 parts by mass of the above-mentioned graphite material.

(4) Paste for Electrodes

The paste for an electrode of the present invention contains the above-mentioned carbon material for a battery electrode and a binder. The paste for an electrode can be obtained by kneading the carbon material for a battery electrode with a binder. A known device such as a ribbon mixer, a screw-type kneader, a Spartan Granulator, a Loedige Mixer, a planetary mixer, or a universal mixer may be used for kneading. The paste for an electrode may be formed into a sheet shape, a pellet shape, or the like.

Examples of the binder to be used for the paste for an electrode include known binders such as: fluorine-based polymers such as polyvinylidene fluoride and polytetrafluoroethylene; and rubber-based binders such as styrene-butadiene rubber (SBR).

The appropriate use amount of the binder is 1 to 30 parts by mass in terms of 100 parts by mass of the carbon material for a battery electrode, and in particular, the use amount is preferably about 3 to 20 parts by mass.

A solvent can be used at a time of kneading. Examples of the solvent include known solvents suitable for the respective binders such as: toluene and N-methylpyrolidone in the case of a fluorine-based polymer; water in the case of SBR; dimethylformamide; isopropanol and the like. In the case of the binder using water as a solvent, it is preferred to use a thickener together. The amount of the solvent is adjusted so as to obtain a viscosity at which a paste can be applied to a current collector easily.

(5) Electrode

An electrode in a preferred embodiment of the present invention comprises a formed body of the above-mentioned paste for an electrode. The electrode is obtained, for example, by applying the paste for an electrode to a current collector, followed by drying and pressure-forming.

Examples of the current collector include foils and mesh of aluminum, nickel, copper, stainless steel and the like. The coating thickness of the paste is generally 50 to 200 μm. When the coating thickness becomes too large, a negative electrode may not be housed in a standardized battery container. There is no particular limitation to the paste coating method, and an example of the coating method includes a method involving coating with a doctor blade or a bar coater, followed by molding with roll pressing or the like.

Examples of the pressure molding include roll pressing, plate pressing, and the like. The pressure for the pressure forming is preferably about 1 to 3 t/cm$^2$. As the electrode density of the electrode increases, the battery capacity per volume generally increases. However, if the electrode density is increased too much, the cycle characteristic is generally degraded. If the paste for an electrode in a preferred embodiment of the present invention is used, the degradation in the cycle characteristic is small even when the electrode density is increased. Therefore, an electrode having the high electrode density can be obtained. The maximum value of the electrode density of the electrode obtained using the paste for an electrode in a preferred embodiment of the present invention is generally 1.6 to 1.9 g/cm$^3$. The electrode thus obtained is suitable for a negative electrode of a battery, in particular, a negative electrode of a secondary battery.

(6) Battery, Secondary Battery

A battery or a secondary battery can be produced, using the above-mentioned electrode as a constituent element (preferably, as a negative electrode).

The battery or secondary battery in a preferred embodiment of the present invention is described by taking a lithium ion secondary battery as a specific example. The lithium ion secondary battery has a structure in which a positive electrode and a negative electrode are soaked in an electrolytic solution or an electrolyte. As the negative electrode, the electrode in a preferred embodiment of the present invention is used.

In the positive electrode of the lithium ion secondary battery, a transition metal oxide containing lithium is generally used as a positive electrode active material, and preferably, an oxide mainly containing lithium and at least one kind of transition metal element selected from the group consisting of Ti, V, Cr, Mn, Fe, Co, Ni, Mo, and W, which is a compound having a molar ratio of lithium to a transition metal element of 0.3 to 2.2, is used. More preferably, an oxide mainly containing lithium and at least one kind of transition metal element selected from the group consisting of V, Cr, Mn, Fe, Co and Ni, which is a compound having a molar ratio of lithium to a transition metal element of 0.3 to 2.2, is used. It should be noted that Al, Ga, In, Ge, Sn, Pb, Sb, Bi, Si, P, B, and the like may be contained in a range of less than 30% by mole with respect to the mainly present transition metal. Of the above-mentioned positive electrode active materials, it is preferred that at least one kind of material having a spinel structure represented by a general formula $Li_xMO_2$ (M represents at least one kind of Co, Ni, Fe, and Mn, and x is 0 to 1.2), or $Li_yN_2O_4$ (N contains at least Mn, and y is 0 to 2) be used.

Further, as the positive electrode active material, there may be particularly preferably used at least one kind of materials each including $Li_yM_aD_{1-a}O_2$ (M represents at least one kind of Co, Ni, Fe, and Mn, D represents at least one kind of Co, Ni, Fe, Mn, Al, Zn, Cu, Mo, Ag, W, Ga, In, Sn, Pb, Sb, Sr, B, and P with the proviso that the element corresponding to M being excluded, y=0 to 1.2, and a=0.5 to 1) or materials each having a spinel structure represented by $Li_z(N_bE_{1-b})_2O_4$ (N represents Mn, E represents at least one kind of Co, Ni, Fe, Mn, Al, Zn, Cu, Mo, Ag, W, Ga, In, Sn, Pb, Sb, Sr, B and P, b=1 to 0.2, and z=0 to 2).

Specifically, there are exemplified $Li_xCoO_2$, $Li_xNiO_2$, $Li_xMnO_2$, $Li_xCo_aNi_{1-a}O_2$, $Li_xCo_bV_{1-b}O_2$, $Li_xCo_bFe_{1-b}O_2$, $Li_xMn_2O_4$, $Li_xMn_cCo_{2-c}O_4$, $Li_xMn_cNi_{2-c}O_4$, $Li_xMn_cV_{2-c}O_4$, and $Li_xMn_cFe_{2-c}O_4$ (where, x=0.02 to 1.2, a=0.1 to 0.9, b=0.8 to 0.98, c=1.6 to 1.96, and z=2.01 to 2.3). As the most preferred transition metal oxide containing lithium, there are given $Li_xCoO_2$, $Li_xNiO_2$, $Li_xMnO_2$, $Li_xCo_aNi_{1-a}O_2$, $Li_xMn_2O_4$, and $Li_xCo_bV_{1-b}O_z$ (x=0.02 to 1.2, a=0.1 to 0.9, b=0.9 to 0.98, and z=2.01 to 2.3). It should be noted that the value of x is a value before starting charge and discharge, and the value increases and decreases in accordance with charge and discharge.

Although the average particle size of the positive electrode active material is not particularly limited, the size is preferably 0.1 to 50 μm. It is preferred that the volume of the particles of 0.5 to 30 μm be 95% or more. It is more preferred that the volume occupied by the particle group with a particle diameter of 3 μm or less be 18% or less of the total volume, and the volume occupied by the particle group of 15 μm or more and 25 μm or less be 18% or less of the total volume. Although the specific area is not particularly limited, the area is preferably 0.01 to 50 m$^2$/g, particularly preferably 0.2 m$^2$/g to 1 m$^2$/g by a BET method. Further, it is preferred that the pH of a supernatant obtained when 5 g of the positive electrode active material is dissolved in 100 ml of distilled water be 7 or more and 12 or less.

In a lithium ion secondary battery, a separator may be provided between a positive electrode and a negative electrode. Examples of the separator include non-woven fabric, cloth, and a microporous film each mainly containing polyolefin such as polyethylene and polypropylene, a combination thereof, and the like.

As an electrolytic solution and an electrolyte forming the lithium ion secondary battery in a preferred embodiment of the present invention, a known organic electrolytic solution, inorganic solid electrolyte, and polymer solid electrolyte may be used, but an organic electrolytic solution is preferred in terms of electric conductivity.

As an organic electrolytic solution, preferred is a solution of an organic solvent such as: an ether such as diethyl ether, dibutyl ether, ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, diethylene glycol dimethyl ether, or ethylene glycol phenyl ether; an amide such as formamide, N-methylformamide, N,N-dimethylformamide, N-ethylformamide, N,N-diethylformamide, N-methylacetamide, N,N-dimethylacetamide, N-ethylacetamide, N,N-diethylacetamide, N,N-dimethylpropionamide, or hexamethylphosphorylamide; a sulfur-containing compound such as dimethylsulfoxide or sulfolane; a dialkyl ketone such as methyl ethyl ketone or methyl isobutyl ketone; a cyclic ether such as ethylene oxide, propylene oxide, tetrahydrofuran, 2-methoxytetrahydrofuran, 1,2-dimethoxyethane, or 1,3-dioxolan; a carbonate such as ethylene carbonate or propylene carbonate; γ-butyrolactone; N-methylpyrrolidone; acetonitrile; nitromethane; or the like. There are more preferably exemplified: esters such as ethylene carbonate, butylene carbonate, diethyl carbonate, dimethyl carbonate, propylene carbonate, vinylene carbonate, and γ-butyrolactone; ethers such as dioxolan, diethyl ether, and diethoxyethane; dimethylsulfoxide; acetonitrile; tetrahydrofuran; and the like. A carbonate-based nonaqueous solvent such as ethylene carbonate or propylene carbonate may be particularly preferably used. One kind of those solvents may be used alone, or two or more kinds thereof may be used as a mixture.

A lithium salt is used for a solute (electrolyte) of each of those solvents. Examples of a generally known lithium salt include $LiClO_4$, $LiBF_4$, $LiPF_6$, $LiAlCl_4$, $LiSbF_6$, $LiSCN$, $LiCl$, $LiCF_3SO_3$, $LiCF_3CO_2$, $LiN(CF_3SO_2)_2$, and the like.

Examples of the polymer solid electrolyte include a polyethylene oxide derivative and a polymer containing the derivative, a polypropylene oxide derivative and a polymer containing the derivative, a phosphoric acid ester polymer, a polycarbonate derivative and a polymer containing the derivative, and the like.

It should be noted that there is no constraint for the selection of members required for the battery configuration other than the aforementioned members.

EXAMPLES

Hereinafter, the present invention is described in more detail by way of typical examples. It should be noted that these examples are merely for illustrative purposes, and the present invention is not limited thereto.

It should be noted that, as for the carbon materials of Examples and Comparative Examples, observation and data analysis with respect to optical structures, average interplanar spacing (d002) by an X-ray diffraction method, average particle diameter (D50) and specific surface area by the BET method are measured by the method described in detail in the "Mode for carrying out the Invention" of the specification. Further, the methods for measuring other physical properties are given below.

(1) Residual Boron Amount

Several ten milligrams of a sample were weighed out and put in a PTFE (polytetrafluoroethylene) decomposition container designed for the microwave oven. Phosphoric acid, nitric acid and sulfuric acid were added thereto sequentially, and the resultant was treated with a microwave thermolysis device to be completely dissolved. After that, the resultant was cooled to room temperature, diluted with ultrapure water and transferred to a polyethylene container to be fixed to a volume of 50 ml. The solution was further diluted ten times and subjected to quantitative analysis by the ICP emission spectrometry using the ICP-AES device.

(2) Method for Evaluating Batteries (a) Production of Paste:

To one part by mass of a carbon material, 0.015 part by mass of carboxymethylcellulose (CMC) as a thickener and water were added as appropriate to adjust the viscosity. 0.038 parts by mass of an aqueous solution in which 40% of styrene butadiene rubber (SBR) fine particles as a solid ratio is dispersed was added thereto and mixed while being stirred to thereby obtain a slurry dispersion having enough flowability to be used as a main material dispersion.

(b) Production of a Negative Electrode:

The main material dispersion was applied to a high-purity copper foil to a thickness of 150 μm using a doctor blade and was dried in vacuum at 70° C. for 12 hours. After punching the copper foil to obtain a piece having an applied portion of 20 cm$^2$, the piece was sandwiched between pressing plates made of super-steel and pressed so that a press pressure becomes about $1 \times 10^2$ to $3 \times 10^2$ N/mm$^2$ ($1 \times 10^3$ to $3 \times 10^3$ kg/cm$^2$) to obtain a negative electrode 1. Also, after punching the above applied portion into a size of 16 mmΦ, the portion was pressed in a similar manner to negative electrode 1 so that a press pressure becomes about $1 \times 10^2$ N/mm$^2$ ($1 \times 10^3$ kg/cm$^3$) to obtain a negative electrode 2.

(c) Production of a Positive Electrode:

90 g of $Li_3Ni_{1/3}Mn_{1/3}Co_{1/3}O_2$, 5 g of carbon black as a conductive additive (manufactured by TIMCAL, C45) and 5 g of polyvinylidene fluoride (PVdF) as a binder were mixed and stirred while adding N-methylpyrrolidone as appropriate to obtain a slurry dispersion.

The dispersion was applied to a uniform thickness onto an aluminum foil having a thickness of 20 μm using a roll coater. After drying, the foil was subjected to roll pressing and punched to obtain a piece having an applied portion of 20 cm$^2$ to obtain a positive electrode.

(d) Production of a Battery:

[Two-Electrode Cell]

In the above negative electrode 1 and positive electrode, a nickel tab and an aluminum tab were fixed to the copper foil and the aluminum foil, respectively. These tabs were faced to each other via a polypropylene microporous membrane and laminated. After packing the laminated electrodes by an aluminum laminated film and injecting an electrolyte thereto, the opening was sealed by thermal fusion bonding to fabricate a battery.

[Lithium Counter Electrode Cell]

In a cell (inner diameter: about 18 mm) with a screwed-type lid made of polypropylene, the above negative electrode 2 and a metal lithium foil punched into a size of 16 mmΦ were sandwiched and stacked between separators (microporous films made of polypropylene (Cell Guard (registered trademark) 2400)). An electrolyte was added to the resultant to obtain a cell for testing.

(e) Electrolyte:

In a mixed solution of 8 parts by mass of ethylene carbonate (EC) and 12 parts by mass of diethyl carbonate (DEC), 1 mol/liter of $LiPF_6$ is dissolved as an electrolyte.

(f) Measurement tests of discharge capacity, initial charge and discharge coulomb efficiency, and voltage at discharge (lithium counter electrode cell):

Tests were conducted using a lithium counter electrode cell. Constant current (CC) charging was performed at 0.2 mA from a rest potential to 0.002 V. Next, the charging was switched to constant voltage (CV) charging at 0.002 V with a cut-off and cut off when a current value dropped to 25.4 μA.

A discharging was performed in the constant-current mode setting a maximum voltage to 1.5 V at a current of 0.2 mA.

The test was performed in a thermostat chamber set at 25° C. At that time, the capacity at the initial discharging was defined as a discharge capacity. Also, the ratio of the electricity of the initial charge and discharge, i.e. discharge electricity/charge electricity in percentage was defined as an index of the initial coulomb efficiency. Furthermore, the voltage when the 50% electricity of the discharge capacity was discharged during the discharging was read.

(g) Charge/Discharge Cycle Capacity Keeping Ratio:

Tests were conducted using a two-electrode cell. The constant-current (CC) mode charging was performed at a predetermined current of 50 mA (corresponding to 2C) from a rest potential to the maximum voltage of 4.15 V. Next, the charging was switched to constant voltage (CV) charging and cut off when a current value dropped to 1.25 mA.

A discharging was performed in the constant-current mode setting a minimum voltage to 2.8 V at a current of 50 mA.

The charge/discharge was repeated 500 cycles in a thermostat chamber set at 25° C. under the above-mentioned conditions.

h) Measurement Test of DC-IR:

On the basis of the battery capacitance obtained by the initial battery capacitance (1C=25 mAh), the constant-current (CC) mode discharging was performed from a fully charged status at 0.1 C for three hours and a half (SOC: 50%). After the stop of 30 minutes, discharging at 25 mA for five seconds was conducted to determine the resistance inside the battery (DC-IR) from the amount of decrease in voltage obeying Ohm's law (R=ΔV/0.025).

i) Electrode Density:

The main material dispersion was applied to a high-purity copper foil to a thickness of 150 μm using a doctor blade and was dried in vacuum at 70° C. for 12 hours. After punching the electrode into a size of 15 mmϕ, it was sandwiched between pressing plates made of super-steel and pressed so that a press pressure applied to the electrode becomes about $1 \times 10^2$ N/mm$^2$ ($1 \times 10^3$ kg/cm$^3$) and the electrode density was calculated from the electrode weight and electrode thickness.

Example 1

A crude oil produced in Liaoning, China (28° API, wax content of 17% and sulfur content of 0.66%) was distilled under ordinary pressure. Using a Y-type zeolite catalyst in a sufficient amount against the heavy distillate, catalytic cracking in a fluidized bed was performed at 510° C. under ordinary pressure. A solid content such as a catalyst was centrifuged until the obtained oil became clear to thereby obtain decant oil 1. The oil was subjected to a small-sized delayed coking process. After keeping the drum inlet temperature at 505° C. and the drum internal pressure to 600 kPa (6 kgf/cm$^2$) for ten hours, the drum was water-cooled to obtain black chunks. After pulverizing the obtained black chunks into pieces up to five centimeters in size with a hammer, they were heated in a rotary kiln (external-heating type with an electrical heater; aluminum oxide SSA-S Φ 120 mm inner tube) in which the outer wall temperature in the center of the inner tube is set at 1,450° C. by adjusting the feeding rate and tilting angle of the black chunks so as to set the retention time to 15 minutes.

The obtained red-hot sample was cooled by water-cooling the outside thereof in an SUS container, while it was sealed from the air and nitrogen as required was introduced so that the inside the container is not subjected to negative pressure. A black and slightly gray block sample up to 2 cm in size was obtained as calcined coke 1.

Calcined coke 1 was observed under a polarizing microscope for the image analysis. As a result of the measurement, when areas of the optical structures are accumulated from the smallest structure in an ascending order, an area of a structure whose accumulated area corresponds to 60% of the total area was 47.4 μm$^2$. When the detected structures are arranged from the structure of the smallest aspect ratio in an ascending order, the aspect ratio of the structure which ranks at the position of 60% in the total number of all the structures was 2.66.

Calcined coke 1 was pulverized with a bantam mill produced by Hosokawa Micron Corporation and subsequently coarse powder was excluded with a sieve having a mesh size of 32 μm. Next, the pulverized coke is subjected to air-flow screening with Turboclassifier TC-15N produced by Nisshin Engineering Inc. to obtain a powder calcined coke 1, substantially containing no particles each having a particle diameter of 1.0 μm or less.

0.78 mass % of $B_4C$ in terms of boron atom was added to the obtained powder of calcined coke 1 and subjected to dry blending for 30 minutes with a V-type mixer to obtain a mixture.

A graphite crucible was filled with the pulverized carbon material and a carbonized carbon felt (2 mm) was softly put on the crucible to prevent a rapid inflow of the air. After placing the crucible in an Acheson furnace and performing the heat treatment at 3,150° C., the mixture was mixed well to be used as a sample.

After measuring the various physical properties of the obtained carbon material, an electrode was produced as described above and the cycle characteristics and the like were measured. Table 1 shows the results.

Example 2

Coal tar derived from bituminous coal was distilled at 320° C. under ordinary pressure and distillate of the distillation temperature or lower was removed. From the obtained tar having a softening point of 30° C., the insoluble matter was removed by filtration at 100° C. to obtain viscous liquid 1. The liquid was subjected to a small-sized delayed coking process. After keeping the drum inlet temperature at 510° C. and the drum internal pressure to 500 kPa (5 kgf/cm$^2$) for ten hours, the drum was water-cooled to obtain black chunks. After pulverizing the obtained black chunks into pieces up to five centimeters in size with a hammer, they were heated in a rotary kiln (external-heating type with an electrical heater; aluminum oxide SSA-S Φ 120 mm inner tube) in which the outer wall temperature in the center of the inner tube is set at 1,450° C. by adjusting the feeding rate and tilting angle of the black chunks so as to set the retention time to 15 minutes.

The obtained red-hot sample was cooled in an SUS container in a similar manner as in Example 1 to obtain black block sample up to 3 cm in size as calcined coke 2.

Calcined coke 2 was observed under a polarizing microscope for the image analysis in the same way as in Example 1. Table 1 shows the results.

FIG. 1 shows a polarizing microscope image (480 μm×540 μm) of the calcined coke 2. The black portion is resin and the gray portion is optical structures.

Calcined coke 2 was pulverized in a similar manner as in Example 1 and subsequently coarse powder was excluded with a sieve having a mesh size of 32 μm. Next, the pulverized coke is subjected to air-flow screening with Turboclassifier TC-15N produced by Nisshin Engineering Inc. to obtain a powder calcined coke 2, substantially containing no particles each having a particle diameter of 1.0 μm or less.

0.78 mass % of $B_4C$ in terms of boron atom was added to the obtained powder of calcined coke 2 and subjected to dry blending for 30 minutes with a V-type mixer to obtain a mixture.

A graphite crucible was filled with the mixture and a carbonized carbon felt (2 mm) was softly put on the crucible to prevent a rapid inflow of the air. After placing the crucible in an Acheson furnace and performing the heat treatment at 3,150° C., the mixture was mixed for 30 minutes with a V-type mixer to be used as a sample.

After measuring the various physical properties of the obtained carbon material, an electrode was produced in the same way as in Example 1 and the cycle characteristics and the like were measured. Table 1 shows the results.

Figure 2:
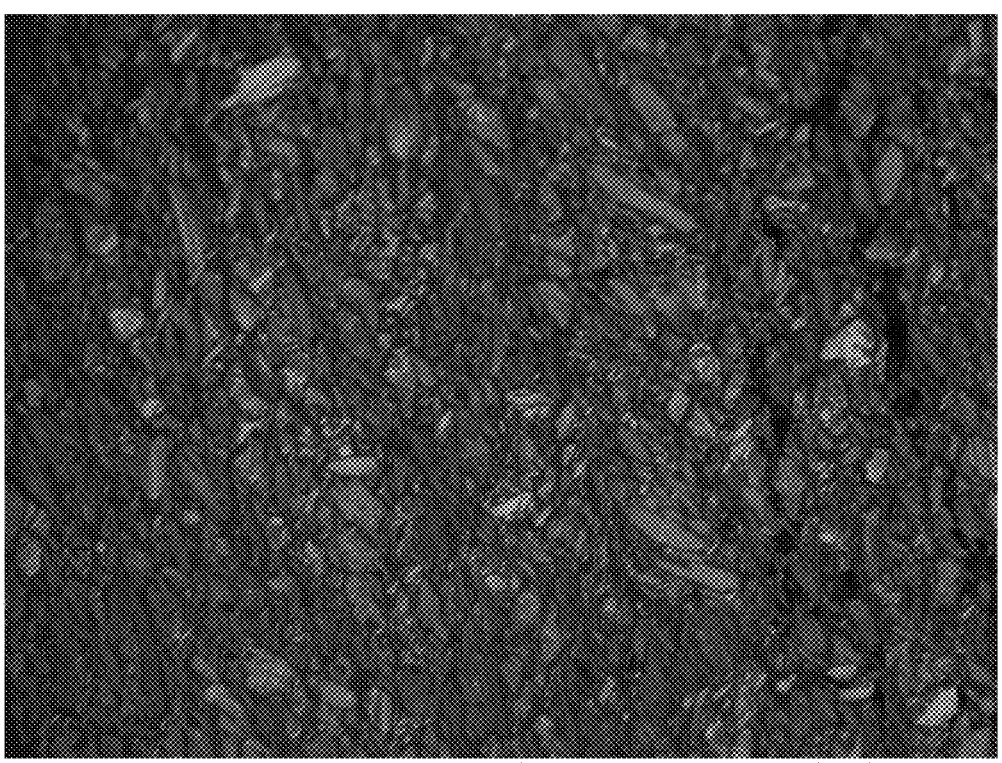
FIG. 2 shows a polarizing microscope image (480 μm×540 μm) of the carbon material of Example 2. The black portion is resin and the gray portion is optical structures.

FIG. 2 shows a polarizing microscope image (480 μm×540 μm) of the carbon material. The black portion is resin and the gray portion is optical structures.

Example 3

An Iranian crude oil (30° API, wax content of 2% and sulfur content of 0.7%) was distilled under ordinary pressure. Using a Y-type zeolite catalyst in a sufficient amount against the heavy distillate, catalytic cracking in a fluidizing bed was performed at 500° C. under ordinary pressure. A solid content such as a catalyst was centrifuged until the obtained oil became clear to thereby obtain decant oil 2. The oil was subjected to a small-sized delayed coking process. After keeping the drum inlet temperature at 550° C. and the drum internal pressure to 600 kPa (6 kgf/cm$^2$) for ten hours, the drum was water-cooled to obtain black chunks. After pulverizing the obtained black chunks into pieces up to five centimeters in size with a hammer, they were heated in a rotary kiln (external-heating type with an electrical heater; aluminum oxide SSA-S Φ 120 mm inner tube) in which the outer wall temperature in the center of the inner tube is set at 1,450° C. by adjusting the feeding rate and tilting angle of the black chunks so as to set the retention time to 15 minutes.

The obtained red-hot sample was cooled in an SUS container in a similar manner as in Example 1 to obtain black and slightly gray block sample up to 2 cm in size as calcined coke 3.

Calcined coke 3 was observed under a polarizing microscope for the image analysis in the same way as in Example 1. Table 1 shows the results.

Calcined coke 3 was pulverized in the same way as in Example 1 to obtain powder calcined coke 3. 0.63 mass % of $B_2O_3$ in terms of boron atom was added to the obtained calcined coke powder and subjected to dry blending for 30 minutes with a V-type mixer to obtain a mixture.

A graphite crucible was filled with the mixture and a carbonized carbon felt (2 mm) was softly put on the crucible to prevent a rapid inflow of the air. After placing the crucible in an Acheson furnace and performing the heat treatment at 3,150° C., the mixture was mixed well to be used as a sample.

After measuring the various physical properties of the obtained carbon material, an electrode was produced in the same way as in Example 1 and the cycle characteristics and the like were measured. Table 1 shows the results.

Comparative Example 1

After subjecting powder calcined coke 2 in Example 2 to heat treatment at 3,150° C. in an Acheson furnace in the same way as in Example 1, the powder was mixed well to be used as a sample.

After measuring the various physical properties of the obtained carbon material, an electrode was produced in the same way as in Example 1 and the cycle characteristics and the like were measured. Table 1 shows the results.

In this Example, the electrolyte is reacted in active edge portions, and the obtained battery was of no practical use due to a low coulomb efficiency at the time of initial charging and discharging, high resistance and a low cycle capacity retention rate.

Comparative Example 2

2.7 mass % of $B_4C$ in terms of boron atom was added to powder of calcined coke 2 in Example 2 and subjected to heat treatment at 3,150° C. in an Acheson furnace in the same way as in Example 1, the powder was mixed well to be used as a sample.

After measuring the various physical properties of the obtained carbon material, an electrode was produced in the same way as in Example 1 and the cycle characteristics and the like were measured. Table 1 shows the results.

In this Example, the electrode has high electrical resistance due to the generation of a large amount of boron nitride on the surface of the carbon material, and poor cycle characteristics. Furthermore, there is a rise in potential, and therefore the electrode causes inconvenience for obtaining a battery having good characteristics.

Comparative Example 3

0.78 mass % of $B_4C$ in terms of boron atom was added to powder of calcined coke 2 in Example 2 and subjected to heat treatment in argon stream at 2,900° C. in a very high-temperature furnace manufactured by Kurata Giken, the powder was mixed well to be used as a sample.

After measuring the various physical properties of the obtained carbon material, an electrode was produced in the same way as in Example 1 and the cycle characteristics and the like were measured. Table 1 shows the results.

In this Example, although the generation of boron nitride on the surface of the carbon material is suppressed, boron is not completely removed due to a low sintering temperature and there is a rise in potential. Also, the cost is very expensive to use argon and it is impractical as a production method.

Comparative Example 4

Residue obtained by distilling crude oil produced in the West Coast under reduced pressure was used as a raw material. The properties of the material are 18° API, wax content of 11 mass % and sulfur content of 3.5 mass %. The material was subjected to a small-sized delayed coking process. After keeping the drum inlet temperature at 490° C. and the drum internal pressure to 200 kPa (2 kgf/cm²) for ten hours, the drum was water-cooled to obtain black chunks. After pulverizing the obtained black chunks into pieces up to five centimeters in size with a hammer, they were heated in a rotary kiln (external-heating type with an electrical heater; aluminum oxide SSA-S Φ 120 mm inner tube) in which the outer wall temperature in the center of the inner tube is set at 1,450° C. by adjusting the feeding rate and tilting angle of the black chunks so as to set the retention time to 15 minutes.

The obtained red-hot sample was cooled in an SUS container in a similar manner as in Example 1 to obtain black block sample up to 3 cm in size as calcined coke 4.

Calcined coke 4 was observed under a polarizing microscope for the image analysis in the same way as in Example 1. Table 1 shows the results.

Calcined coke 4 was pulverized in the same way as in Example 1 to obtain powder of calcine coke 4. 0.78 mass % of $B_4C$ in terms of boron atom was added to the obtained calcined coke powder and subjected to dry blending for 30 minutes with a V-type mixer to obtain a mixture.

A graphite crucible was filled with the mixture and a carbonized carbon felt (2 mm) was softly put on the crucible to prevent a rapid inflow of the air. After placing the crucible in an Acheson furnace and performing the heat treatment at 3,150° C., the mixture was mixed well to be used as a sample.

After measuring the various physical properties of the obtained carbon material, an electrode was produced in the same way as in Example 1 and the cycle characteristics and the like were measured. Table 1 shows the results.

In this Example, the electrode has a low volume capacity density and inconvenience is caused for obtaining a battery having a high density.

Comparative Example 5

A graphite crucible was filled with powder calcined coke 4 obtained in Comparative Example 4 and a carbonized carbon felt (2 mm) was softly put on the crucible to prevent a rapid inflow of the air. After placing the crucible in an Acheson furnace and performing the heat treatment at 3,150° C., the mixture was mixed well to be used as a sample.

After measuring the various physical properties of the obtained carbon material, an electrode was produced in the same way as in Example 1 and the cycle characteristics and the like were measured. Table 1 shows the results.

In this Example, the electrode has a low volume capacity density and inconvenience is caused for obtaining a battery having a high density.

Comparative Example 6

After measuring the various physical properties of SFG44 produced by TIMCAL Graphite & Carbon, an electrode was produced in the same way as in Example 1 and the cycle characteristics and the like were measured. Table 1 shows the results.

In this Example, the battery has a low cycle capacity retention rate and inconvenience is caused for obtaining a long life battery.

TABLE 1

|  |  | Ex. 1 | Ex. 2 | Ex. 3 | Comparative Ex. 1 | Comparative Ex. 2 |
|---|---|---|---|---|---|---|
| Area (SOP) | μm² | 12.80 | 25.76 | 19.68 | 25.44 | 25.28 |
| Aspect ratio (AROP) | — | 2.15 | 2.16 | 2.15 | 2.18 | 2.18 |
| Average particle diameter (D50) | μm | 19.6 | 23.0 | 21.5 | 20.5 | 22.9 |
| (SOP * AROP)$^{1/2}$/D50 | — | 0.27 | 0.32 | 0.30 | 0.36 | 0.32 |
| d002 | nm | 0.3355 | 0.3354 | 0.3355 | 0.3355 | 0.3353 |
| BET specific surface area | m²/g | 1.2 | 1.1 | 1.2 | 1.2 | 0.9 |
| Structure area of the material calcined coke corresponding to 60%* | μm² | 47.4 | 111 | 74.7 | 111 | 111 |
| Aspect ratio of the material calcined coke ranking at the position of 60% | — | 2.66 | 2.81 | 2.52 | 2.81 | 2.81 |
| Electrode density (1t press) | g/cc | 1.62 | 1.61 | 1.60 | 1.6 | 1.66 |
| Discharge capacity | mAh/g | 340 | 346 | 347 | 314 | 336 |
| Discharge capacity density | mAh/cc | 551 | 557 | 555 | 502 | 558 |
| Initial charge and discharge coulomb efficiency | % | 91 | 92 | 92 | 71 | 91 |
| Cycle capacity retention rate (500 cycles) | % | 86 | 88 | 85 | 62 | 75 |
| DC-IR (SOC 50%) | Ω | 1.3 | 1.4 | 1.4 | 1.7 | 1.6 |
| Potential at the time of 50% discharge (V vs Li/Li⁺) | V | 0.157 | 0.158 | 0.156 | 0.149 | 0.169 |
| Additive amount of boron | mass % | 0.78 | 0.78 | 0.63 | No addition | 2.34 |
| Amount of residual boron | mass % | 0.33 | 0.31 | 0.25 | — | 0.92 |

|  |  | Comparative Ex. 3 | Comparative Ex. 4 | Comparative Ex. 5 | Comparative Ex. 6 |
|---|---|---|---|---|---|
| Area (SOP) | μm² | 24.96 | 5.76 | 5.76 | 28.96 |
| Aspect ratio (AROP) | — | 2.18 | 1.91 | 1.91 | 2.28 |
| Average particle diameter (D50) | μm | 22.6 | 22.3 | 22.3 | 24.8 |
| (SOP * AROP)$^{1/2}$/D50 | — | 0.33 | 0.15 | 0.15 | 0.33 |
| d002 | nm | 0.3352 | 0.3360 | 0.3364 | 0.3354 |
| BET specific surface area | m²/g | 0.7 | 1.4 | 1.9 | 4.6 |
| Structure area of the material calcined coke corresponding to 60%* | μm² | 111 | 6.4 | 6.4 | — |
| Aspect ratio of the material calcined coke ranking at the position of 60% | — | 2.81 | 2.00 | 2.00 | — |
| Electrode density (1t press) | g/cc | 1.61 | 1.31 | 1.30 | 1.54 |
| Discharge capacity | mAh/g | 342 | 343 | 330 | 358 |
| Discharge capacity density | mAh/cc | 551 | 449 | 429 | 551 |
| Initial charge and discharge coulomb efficiency | % | 90 | 91 | 91 | 89 |
| Cycle capacity retention rate (500 cycles) | % | 85 | 85 | 87 | 60 |
| DC-IR (SOC 50%) | Ω | 1.3 | 1.6 | 1.5 | 1.5 |
| Potential at the time of 50% discharge (V vs Li/Li⁺) | V | 0.170 | 0.156 | 0.150 | 0.150 |
| Additive amount of boron | mass % | 1.74 | 0.78 | No addition | No addition |
| Amount of residual boron | mass % | 1.04 | 0.44 | — | — |

The invention claimed is:

1. A carbon material, which contains boron atom in an amount of 0.001 to 0.5 mass %, in which the average interplanar spacing d002 of plane (002) by the X-ray diffraction method is 0.337 nm or less; and by observing the optical structures in the cross-section of the formed body made of the carbon material in a rectangular field of 480 μm×540 μm under a polarizing microscope, when areas of the optical structures are accumulated from a smallest structure in an ascending order, SOP represents an area of an optical structure whose accumulated area corresponds to 60% of the total area of all the optical structures; when the structures are counted from a structure of a smallest aspect ratio in an ascending order, AROP represents the aspect ratio of the structure which ranks at the position of 60% in the total number of all the structures; and when D50 represents a volume-based average particle diameter by laser diffraction method; SOP, AROP and D50 satisfy the following relationship:

1.5≤AROP≤6 and 0.2×D50≤(SOP×AROP)$^{1/2}$<2×D50.

2. The carbon material as claimed in claim 1, wherein the carbon material has a volume-based average particle diameter by laser diffraction method (D50) of 1 μm or more and 50 μm or less.

3. The carbon material as claimed in claim 1, which is artificial graphite treated at a temperature of 3,000° C. or more and 3,600° C. or less in atmosphere containing 50 vol % or more of nitrogen.

4. The carbon material as claimed in claim 1, of which the BET specific surface area is 0.4 m²/g or more and 5 m²/g or less.

5. A method for producing the carbon material as claimed in claim 1, comprising a process of mixing boron or a boron compound into the particles obtained by pulverizing the calcined coke in an amount of 0.01 to 2 mass % in terms of boron atom and subjecting the mixture to heat treatment at a temperature of 3,000° C. or more and 3,600° C. or less in atmosphere containing 50 vol % or more of nitrogen.

6. The production method as claimed in claim 5, wherein by observing the optical structures of the calcined coke in a rectangular field of 480 μm×540 μm under a polarizing microscope, when areas of the optical structures are accumulated from a smallest structure in an ascending order, the area of an optical structure whose accumulated area corresponds to 60% of the total area of all the optical structures is 10 μm² or more and 5,000 μm² or less; when the optical structures are counted from a structure of a smallest aspect ratio in an ascending order, the aspect ratio of the structure which ranks at the position of 60% in the total number of all the structures is 1.5 or more and 6 or less.

7. A carbon material for a battery electrode, comprising the carbon material as claimed in claim 1.

8. A paste for an electrode comprising the carbon material for a battery electrode as claimed in claim 7 and a binder.

9. An electrode comprising a formed body of the paste for an electrode claimed in claim 8.

10. A battery comprising the electrode claimed in claim 9 as a constituting element.

11. A lithium ion secondary battery comprising the electrode claimed in claim 9 as a constituting element.

12. The lithium ion secondary battery as claimed in claim 11, containing a non-aqueous electrolyte and/or non-aqueous polymer electrolyte, wherein a non-aqueous solvent used for the non-aqueous electrolyte and/or non-aqueous polymer electrolyte is at least one member selected from a group consisting of ethylene carbonate, diethyl carbonate, dimethyl carbonate, methylethyl carbonate, propylene carbonate, butylene carbonate, γ-butyrolactone and vinylene carbonate.

13. A carbon material for a battery electrode, comprising 100 parts by mass of the carbon material as claimed in claim 1 and 0.01 to 200 parts by mass of natural graphite or artificial graphite, wherein an average interplanar spacing (d002) of the natural graphite or artificial graphite is 0.3370 nm or less.

14. A carbon material for a battery electrode, comprising 100 parts by mass of the carbon material as claimed in claim 1 and 0.01 to 120 parts by mass of natural graphite or artificial graphite, wherein an aspect ratio of the natural graphite or artificial graphite is 2 to 100, and an average interplanar spacing (d002) of the natural graphite or artificial graphite is 0.3370 nm or less.

* * * * *